(12) United States Patent
DeFeo et al.

(10) Patent No.: US 7,579,418 B2
(45) Date of Patent: Aug. 25, 2009

(54) EXTRUSION PROCESS AND PRODUCT

(75) Inventors: Patrick Anthony DeFeo, West Grove, PA (US); Glenn W. Heffner, Wilmington, DE (US); Niall D. McKee, Newark, DE (US); Sundar Kilnagar Venkataraman, Vienna, WV (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 838 days.

(21) Appl. No.: 10/832,849

(22) Filed: Apr. 27, 2004

(65) Prior Publication Data
US 2004/0232580 A1 Nov. 25, 2004

Related U.S. Application Data

(60) Provisional application No. 60/470,310, filed on May 14, 2003.

(51) Int. Cl.
*C08F 16/24* (2006.01)
(52) U.S. Cl. .................. 526/247; 264/40.6; 264/210.1; 526/89; 526/206; 526/214; 526/254; 526/255
(58) Field of Classification Search ................. 526/247, 526/255, 254, 214, 206, 89; 264/210.1, 40.6
See application file for complete search history.

(56) References Cited

U.S. PATENT DOCUMENTS

| 4,743,658 | A | | 5/1988 | Imbalzano et al. | |
|---|---|---|---|---|---|
| 5,677,404 | A | * | 10/1997 | Blair | 526/247 |
| 5,703,185 | A | * | 12/1997 | Blair | 526/247 |
| 6,103,844 | A | | 8/2000 | Brothers | |
| 6,489,420 | B1 | * | 12/2002 | Duchesne et al. | 526/255 |
| 6,703,464 | B2 | * | 3/2004 | Kono et al. | 526/247 |
| 7,105,619 | B2 | * | 9/2006 | Kono et al. | 526/247 |

FOREIGN PATENT DOCUMENTS

EP 0 162 496 A1 11/1985
WO WO 03/059970 A1 7/2003

OTHER PUBLICATIONS

George Odian, Principles of Polymerization, (1991), p. 241, Third Edition, John Wiley & Sons, Inc., New York.

* cited by examiner

*Primary Examiner*—Peter D. Mulcahy
*Assistant Examiner*—Henry Hu

(57) ABSTRACT

The present invention relates to the process of extruding melt drawing fluoropolymer onto conductor to form insulated conductor at a line speed of at least 533 m/min and having no more than 10 sparks and no more than 2 lumps/13.7 km of insulated conductor under conditions that comprise an adequate process window to allow for these results to be obtained at different conditions within the process window. The invention identifies the critical parameters for achieving this process window, namely melt flow rate of the fluoropolymer, preferably being 30±3 g/10 min, and the melt temperature of the extruding/melt-drawing step, preferably being 393° C.±6° C.

4 Claims, No Drawings even in line speed can be accommodated by using as the fluoropolymer a melt-fabricable TFE/HFP copolymer that also contains a small amount of additional copolymerized monomer that imparts toughness to the copolymer (additional toughness monomer), and (B) the presence of the toughness monomer results in a unique relationship between MFR and MV that enables the identification of fluoropolymers that are especially effective in high speed extrusion/melt draw-down coating of conductors.

EXTRUSION PROCESS AND PRODUCT

BACKGROUND OF THE INVENTION

1. Field of the Invention

This invention relates to an improved process for coating a conductor with fluoropolymer insulation and to a fluoropolymer therefor.

2. Description of Related Art

U.S. Pat. No. 5,703,185 discloses an improved fluoropolymer, wherein the improvement enables the fluoropolymer to be extruded and the molten polymer to be drawn down (melt-draw down) to form insulation on a conductor at higher line speeds. Extrusion/melt draw-down to form insulated conductor is shown on pp. 17-19 of the TEFLON®/TEFZEL® Melt extrusion Guide, published by the DuPont Company in March, 1993. The extrusion conditions in Example 10 of '185 include the line speed, the draw down ratio for the melt draw-down step (97:1), the melt temperature increasing from 757 to 774° F. (403 to 412° C.) as the line speed is increased, and the copolymer having a melt viscosity (MV) of $2.37 \times 10^3$ Pa.s at standard conditions. This melt viscosity is calculated from the melt flow rate in g/10 min (MFR) of the copolymer through a specified orifice under a specified weight in accordance with ASTM D1238-52T modified as described in U.S. Pat. No. 4,380,618 (calculation: MV=53150/grams of copolymer flowing through the orifice in 10 min). Thus, in Example 10 it is disclosed that the tetrafluoroethylene/hexafluoropropylene/perfluoro(ethyl vinyl ether) (TFE/HFP/PEVE) copolymer can be extruded and drawn down onto the conductor at line speeds of 1500 to 3000 ft/min (456 to 914 m/min) to form insulation that has low incidence of spark failures, i.e. ranging from zero at 13 km coated length of conductor to 4 for 14.3 km coated length of conductor. In contrast, the corresponding TFE/HFP copolymer wherein the additional monomer is perfluoro(propyl vinyl ether) (PPVE) could not form insulation of comparable low failure incidence at line speeds above 1900 ft/min (579 m/min). In commercial practice, line speeds in excess of 2250 ft/min (686 m/min) are difficult to control, whereby line speeds in the range of 1750 to 2250 ft/min (533 to 686 m/min) are considered highly desirable.

The problem has arisen that when the fluoropolymer is supplied to a multiplicity of insulated conductor manufacturers, the extrusion/melt draw-down process is carried out under a variety of conditions, resulting in the fluoropolymer performing better for some manufacturers than for others, and for each manufacturer, better on some days than on others. The UL 444 industry standard for spark failures is no more than 15 spark failures per 45,000 ft (13.7 km) of coated conductor. A spark failure indicates a fault in the insulation. Industry prefers that no more than 10 spark failures be present/13.7 km of insulated conductor to insure acceptable insulated conductor. An additional quality criterion desired by the industry is that for the same length of coated conductor, the insulation should have no more than 2 lumps/13.7 km. Lumps in the insulation interfere with the ultimate use of the insulated conductor; e.g. twisting together to form twisted pair conductors, pulling the insulated conductor through narrow openings.

The manufacturer is faced with the question of how to consistently maintain high productivity of insulated conductor of the desired quality. The manufacturer can also change certain process conditions. These are: a) polymer melt temperature, b) line speed, c) tooling, i.e. the sizing of the guide tip for the conductor and the diameter of the extrusion die, which determines the annular gap for the molten resin between the O.D. (outer diameter) of the die and the O.D. of the guide tip), and d) cone length (distance between the die through the tubing of molten polymer is extruded and the point at which the drawn molten tube (in the form of a cone) contacts the conductor).

The tooling determines the draw-down ratio of the extrusion/melt draw-down step. Draw-down ratio (DDR) is the ratio of the cross-sectional area of annular gap through which the molten resin is extruded and the cross-sectional area of the resultant insulation. A wide range of draw-down ratios are used in the industry, typically between 60 to 120:1. The manufacturer can change the tooling in order to change the DDR, but this requires extruder purging and cool-down, the tooling change, then heat-up and recharging with fluoropolymer. This is time-consuming and economically infeasible and moreover, it is not clear whether the DDR should be increased or decreased in order to solve insulation quality problems at high line speed. Even if a change in DDR produces success, this may only be temporary, since the DDR changes with different gauges of conductor coated with the fluoropolymer insulation and with the use of a given gauge because of gauge variations along the conductor length.

As in the case of changing DDR, the possibility of changing temperatures and cone length are "hit and miss", i.e. by guesswork. Cone length is changed by changing the vacuum that draws the tubing of molten polymer down onto the conductor, thus forming the cone in the transition between extrusion and conductor contact. Temperature changes are typically carried out by changing the temperature profile along the length of the extruder. Success by temperature changes tends to be temporary, because some other change in the process or in the polymer adversely affects the quality of the insulation. For this reason, most manufacturers simply monitor the temperature profile along the length of the extruder, but not the melt temperature at the time of extrusion.

The manufacturer of the insulated conductor is also faced with the variability introduced into the fluoropolymer by adding pigment to the fluoropolymer prior to extrusion/melt draw-down, with pigment addition varying in amount and type to obtain the insulation color desired. The manufacturer must consider whether an insulation quality problem arises from the addition of the pigment to the fluoropolymer. The most common pigments used can be reasonably represented by the use in experiments of both white and orange.

Faced with the onset of quality (spark and/or lump) problems, and at least the uncertainty of changing DDR, operating temperatures, and cone length, the manufacturer typically reduces line speed until the desired quality insulated conductor is reached, resulting in a loss of productivity.

From the standpoint of the fluoropolymer manufacturer, the challenge is whether there is improvement possible in the fluoropolymer that the would accommodate the unavoidable differences among customers and among extruders and their operators and permit high quality insulated conductor to be made at high speeds.

BRIEF SUMMARY OF THE INVENTION

The present invention meets the challenge by providing a fluoropolymer and an extrusion/melt draw-down process for forming insulation on a conductor that together provide a window of operating conditions wide enough so that consistently good results, in terms of high line speed operation and high quality insulation can be achieved despite normal variation among manufacturers and equipment. Embodied in the present invention are the discoveries that (A) the variability of pigmentation, changes in DDR and cone length, and changes in temperature profile are neither causes nor cures for spotty insulation quality and (B) it is not necessary to reduce line speed to solve the problem. With regard to (B), the present invention has found that the first choice of the industry for solving extrusion problems is inapplicable to the goal of preserving high line speed while maintaining insulation quality.

In one aspect, the present invention can be described as a process for forming insulation on a conductor, comprising (a) extruding and melt drawing a melt-flowable fluoropolymer at a specified melt temperature to form said insulation on said conductor, (b) cooling the resultant insulation, and (c) winding up the resultant insulated conductor at rate corresponding to a line speed of at least about 1750 ft/min (533 m/min), with the proviso that prior to step (a)

(i) determining the melt flow rate of said fluoropolymer that provides the fewest defects in said insulation at said line speed and the draw-down ratio of said melt drawing and (ii) determining said melt temperature for said extruding of said fluoropolymer of said melt flow rate at which said insulation is substantially defect-free at said line speed, said extruding and melt drawing being carried out using said fluoropolymer having said melt flow rate as determined by step (i) and said specified melt temperature being said melt temperature determined by step (ii).

By substantially defect-free is meant that the insulation has no more than 10 spark failures and no more the 2 lumps/13.7 km of coated conductor. Insulation satisfying these criteria is considered to be of acceptable quality.

In accordance with the determining steps (i) and (ii) above, it has been found that establishment of a certain melt flow rate for the fluoropolymer by the fluoropolymer manufacturer coupled with establishment of a certain melt temperature for the extrusion/melt draw-down process by the insulated conductor manufacturer provides operating conditions so that consistently good results, in terms of high line speed operation and high quality insulation can be achieved despite normal variation among manufacturers and equipment. The determining steps (i) and (ii) provide both specific MFRs and melt temperatures at which the process can be operated and ranges of MFRs and melt temperatures for such operation. The ranges provide the process window for successful operation despite the aforesaid variation, and the specific MFRs and melt temperatures provide for operation within the process window.

This methodology for carrying out the extrusion/melt draw-down process runs counter to the experience of the industry for solving quality problems, i.e. sacrifice line speed in order to maintain or restore quality. It is preferred that the fluoropolymer have a high melt flow rate, namely melt flow rate (MFR) within the range of 30±3 g/10 min, which is greater than the 22 g/10 min for the improved fluoropolymer of Example 10 of U.S. Pat. No. 5,703,185. The fluoropolymer having an MFR within this range will also have some MFR variability, resulting from the nature of batch polymerizations used to make the fluoropolymer. This variability will be less than ±3 g/10 min, but the fact that some variability exists means that the operating window for the extrusion/melt draw-down process must be broad enough to accommodate small variations in fluoropolymer MFR and still obtain acceptable quality insulation at high line speed. Simply increasing the MFR of the fluoropolymer from 22 g/10 min, however, leads to reduced insulation quality.

It is also preferred that the melt temperature of the fluoropolymer in the extruder be relatively low, i.e. in the range of 393° C.±6° C. (740° F.±10° F.), which is less than the melt temperatures used in Example 10 of U.S. Pat. No. 5,703,185. Use of higher MFR polymer at reduced melt temperature, produces the surprising result that high quality insulated conductor can be produced at line speeds of at least about 533 m/min.

In one embodiment of the present invention, the extrusion and draw-down step is carried out using a fluoropolymer having an MFR within the above range and using a melt temperature within the above range. Typically the draw-down ratio will fall within the range of about 60-120:1.

In a preferred embodiment, the MFR and the specified melt temperature can be ranges of MFR and melt temperatures as set forth above, i.e. the MFR of the fluoropolymer can vary within the MFR range, and the melt temperature used in the extrusion/melt draw-down step can also vary within its range, and surprisingly, high quality insulated conductor can still be obtained, relatively independent of the variation in draw-down ratios and pigment used, while achieving line speeds of at least about 533 m/min. Thus not only is high quality insulated conductor obtained (no more than 10 sparks and 2 lumps/13.7 km), but an operating window is provided, within which different manufacturers can operate under different conditions and still obtain the desired result—high quality insulated conductor at high line speed. Such operating window can be defined by an MFR range of 30±3 g/10 min, preferably about 30±2 g/10 min. a preferred melt temperature range of 393° C.±4° C., and a draw down ratio range of about 60-120:1, preferably 80-100:1. The operating window for this preferred embodiment may in fact exceed the limits of one or more of these ranges, in which case the preferred range would be included in the broader range, to provide an even broader operating window.

A preferred fluoropolymer for use in the process of the present invention, itself being a novel fluoropolymer, is tetrafluoroethylene/hexafluoropropylene copolymer having a melt flow rate of about 30±3 g/10 min, preferably about 30±2 g/10 min.

DETAILED DESCRIPTION OF THE INVENTION

To demonstrate the methodology of the present invention, the tetrafluoroethylene/hexafluoropropylene copolymer of Example 10 of U.S. Pat. No. 5,703,185 is selected. The copolymer contains a small amount of copolymerized PEVE. A series of extrusion/melt draw-down processes are conducted using the extruder for melt draw-down extrusion coating of the copper conductor, all as described in Example 10. The line speed is 2000 ft/min (610 m/min). The melt temperature of the copolymer is the temperature of the molten copolymer in the transition section between the extruder and the crosshead wherein the molten resin and the conductor are both traveling in the same direction. The melt temperature is measured by a thermocouple contacting the melt. This is the general procedure used in the tests described hereinafter. 45,000 ft (13.7 km) lengths of fluoropolymer insulated copper conductor are produced, which are then tested for sparks and lumps. The average of three runs (3×13.7 km lengths) are used for each spark and lump determination. The tests for sparks and lumps are conducted in-line on the insulated conductor. The spark test is carried out by exposing the outer surface of the insulation to a voltage of 2.5 kV and recording spark failures. Lumps are measured optically by laser measurement of changes in the diameter of the insulation. An increase in diameter of at least 50% is considered a lump. When spark failures exceed the quality limit, lump failures may not be reported.

A. In this test, the fluoropolymer is the copolymer having an MFR of 22 g/10 min of the aforesaid Example 10, draw-down ratio of is 97:1, and the melt temperature is 760° F. (404° C.) The insulated conductor exhibits 1 sparks and 0 lumps, acceptable quality.

B. Repetition of Test A, but decreasing the melt temperature to 757° F., (403° C.) results in the insulated conductor exhibiting greater than 3.5 sparks. At 754° F. (401° C.) the insulated conductor exhibits 13.6 sparks. When the melt temperature is further decreased to 750° F. (399° C.), the insulated wire exhibits 38 sparks. When the melt temperature is further reduced to 740° F. (393° C.), the insulated conductor exhibits 151 sparks. At 720° F. (382° C.) melt temperature, the insulated conductor exhibits greater than a 620 spark failures. The increase in lumps follows a similar pattern. The Test reveals the extreme sensitivity of the extrusion/melt draw-down process to small changes in melt temperature.

C. Repetition of Test A, but increasing the melt temperature to 767° F. (408° C.), decreases the melt strength of the cone, leading to increasing spark failures and increasing degradation of the fluoropolymer as indicated by the presence of black specs in the insulation. The decrease in melt strength also periodically produces complete rupture of the insulation. Shortening of the cone length helps avoid rupturing, but the window of operation within which acceptable spark failures are obtained is only on the order of several ° C., which is too narrow for commercial operation.

D. Repetition of Test A, but decreasing the draw-down ratio to 85:1, results in the insulated conductor exhibiting greater than 10 spark failures.

While high quality insulated conductor is producible using the copolymer of Example 10, Tests B-D show that the window of operating conditions is quite narrow, making it difficult for different manufacturers to obtain the same desired result of both high quality and high line speed. As the line speed is reduced from 2000 ft/min (610 m/min), the frequency of spark failures is reduced.

E. In this test, the MFR of the copolymer is increased to 26 g/10 min during polymerization by the well-known method of increasing polymerization initiator concentration. This method is disclosed on p. 241 of Principle of Polymerization, 3$^{rd}$ Ed, published by John Wiley ((1991) and in the sentence bridging cols. 3 and 4 of U.S. Pat. No. 6,103,844 and is the general method for changing MFR of the copolymer in later Tests described herein. Within the draw-down ratio range of 60-100:1, the melt temperature range to produce acceptable quality insulated conductor at a line speed of 610 m/min is only 5° F. (2.8° C.), which is narrower than the variation in melt temperature typically present in the industry. Outside this narrow melt temperature range, either the spark failures exceed 10 or the lumps exceed 2 or both.

F. In this test, the MFR of the copolymer is increased to 35 g/10 min and, using the melt temperature of Test A, the resultant insulated conductor exhibits 20 spark failures and 20 lumps.

G. In this test, the MFR of the copolymer is 30 g/10 min and using the melt temperature of Test A, the resultant insulated conductor exhibits greater than 10 sparks and greater than 2 lumps, thereby having inadequate quality.

H. In this test, Test G is repeated except that the melt temperature is decreased to 740° F. (393° C.). Surprisingly, the resultant insulated conductor passes both the spark and lump tests, exhibiting 0-3 sparks and 0-1 lumps in repeat testing. This same result is obtained when the melt temperature is changed within the range 734 to 746° F. (390 to 397° C.) and the draw down ratio is 80-100:1. The same result is obtained when the MFR of the copolymer is varied within the range of 28-32 g/10 min, except that the melt temperature range of operability shifts slightly, e.g. at the MFR of 32 9/10 min, the melt temperature of 748° F. (398° C.) provides acceptable quality. Similar result are obtained when the range of draw-down ratios in widened to 60-120:1, except that the melt temperature window narrows to 7° C. These good results are obtained when the copolymer is pigmented white or orange and the cone length is in the range generally used in industry (25 to 75 mm). As the MFR or melt temperature moves out of these ranges, the occurrence of sparks and lumps increases drastically. The MFR range of 30±3 g/10 min and melt temperature range of 393° C.±6° C. include the transition from acceptable quality to borderline quality, the narrower MFR and melt temperature ranges giving the most consistent highest quality results. These results are obtained when the line speed is varied from 533 m/min to 686 m/min and gave the appearance of being obtainable at even higher line speeds, which were not tested because of the limits of practical controllability in commercial practice. When the melt temperature is decreased below 730° F. (388° C.), e.g. in the range of 720-729° F. (382-387° C.), or above 750° F. (399° C.), the quality of the insulated conductor at the line speed of 610 m/min is unacceptable. The results of Test H provide an adequate window of operating conditions with respect to melt temperature, range of draw ratios, cone length, and differences in pigmentation present in the industry.

In the foregoing Tests, copolymers of different MFRs are tested over a range of melt temperatures typically varying by at least 30° F. and more often 40° F. Within the range of 720° F. to 767° F. (382 to 408° C.), it has been discovered that a relatively narrow melt temperature range centered around 740° F. (393° C.) provides the acceptable result, with unacceptable results arising sharply outside the narrow melt temperature range.

The foregoing described methodology is applicable to melt-flowable fluoropolymers in general. Such fluoropolymers are partially crystalline; i.e. they are not elastomers. One group of preferred fluoropolymers is the perfluorinated polymers, i.e., copolymers of tetrafluoroethylene (TFE) with perfluorinated monomer. The copolymer can include one or more of such perfluorinated comonomer. Examples of perfluorinated monomers include perfluoroolefins containing 3-8 carbon atoms, such as hexafluoropropylene (HFP), and perfluoro(alkyl vinyl ether)(PAVE), wherein the alkyl group contains 1 to 5 carbon atoms. Examples of such vinyl ethers include perfluoro(methyl, ethyl, and propyl vinyl ether). Copolymers of TFE and PAVE are commonly available as PFA copolymers, including MFA copolymer, which is a copolymer of TFE with perfluoro(methyl vinyl ether) and at least one additional vinyl ether, such as perfluoro(propyl vinyl ether). The MFR of PFA copolymer is determined in accordance with ASTM D 3307-93. Copolymers of TFE and HFP are commonly available as FEP copolymers. Typically the HFP content of the copolymer will be characterized by an hexafluoropropylene Index (HFPI) of about 2.0-5.3. HFPI is the ratio of two infrared absorbances measured on a film of the copolymer, which can be converted to wt % HFP by multiplying by 3.2 as disclosed in the paragraph bridging cols. 3 and 4 of U.S. Pat. No. 5,703,185. Preferably, the TFE/HFP copolymer contains at least one additional copolymerized monomer such as PAVE in a amount effective for the copolymer to exhibit an MIT flex life to be at least about 2000 cycles, preferably at least about 4000 cycles. Measurement of MIT flex life is disclosed in U.S. Pat. No. 5,703,185. Generally the amount of such additional monomer will be from about 0.2 to 3 wt %, based on the total weight of the copolymer. One preferred PAVE is perfluoro(propyl vinyl ether) and the most preferred PAVE is perfluoro(ethyl vinyl ether). The MFR of the FEP copolymers are determined in accordance with ASTM D2116-91a.

The preferred process of the present invention is carried out with the fluoropolymer being tetrafluoroethylene and hexafluoropropylene copolymer having an MFR in the range of about 30±3 g/10 min and wherein the melt temperature is in the range of about 393° C.±6° C., and the draw-down ratio of said melt drawing is in the range of about 60-120:1. The tetrafluoroethylene/hexafluoropropylene copolymer having a melt flow rate of about 30±3 g/10 min is a novel polymer. More preferably, the MFR is in the range of about 30±2 g/10 min and said melt temperature is in the range of about 393° C.±4° C. Each of these preferred processes can be carried out wherein the draw ratio is in the range of about 80-100:1, and preferably the extrusion/melt draw-down process is conducted wherein the operating window to produce acceptable quality insulated conductor at a line speed of at least about 533 m/min is achieved within each of these ranges. The most preferred copolymer contains copolymerized PAVE as described above, said copolymer being polymerized and isolated in the absence of added alkali metal salts, and having no more than about 50 unstable endgroups, such as can be achieved by fluorination of the polymer as taught in U.S. Pat. No. 4,743,658.

What is claimed is:

1. Tetrafluoroethylene/hexafluoropropylene copolymer having a melt flow rate of 30±3 g/10 min, said copolymer containing an amount of perfluoro(alkyl vinyl ether), wherein the alkyl contains from 1 to 5 carbon atoms effective for said copolymer to have an MIT flex life of at least about 4000 cycles.

2. The copolymer of claim 1 wherein said perfluoro(alkyl vinyl ether) is perfluoro(ethyl vinyl ether).

3. The copolymer of claim 1 capable of being extruded as insulation on wire at a line speed of at least about 1750 ft/min at a melt temperature in the range of 393° C.±6° C.

4. The copolymer of claim 3 wherein said melt temperature is in the range of 393° C.±4° C.

* * * * *

UNITED STATES PATENT AND TRADEMARK OFFICE
CERTIFICATE OF CORRECTION

PATENT NO. : 7,579,418 B2
APPLICATION NO. : 10/832849
DATED : August 25, 2009
INVENTOR(S) : DeFeo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1234 days.

Signed and Sealed this

Fourteenth Day of December, 2010

David J. Kappos
*Director of the United States Patent and Trademark Office*